(12) United States Patent
Kaletsch

(10) Patent No.: US 8,766,201 B2
(45) Date of Patent: Jul. 1, 2014

(54) DEVICE, METHOD AND SYSTEM FOR DETECTING NUCLEAR RADIATION LEVELS

(76) Inventor: Kai Kaletsch, Saskatchewan (CA)

(*) Notice: Subject to any disclaimer, the term of this patent is extended or adjusted under 35 U.S.C. 154(b) by 2 days.

(21) Appl. No.: 13/697,464

(22) PCT Filed: May 16, 2012

(86) PCT No.: PCT/CA2012/000469
§ 371 (c)(1),
(2), (4) Date: Nov. 12, 2012

(87) PCT Pub. No.: WO2013/170336
PCT Pub. Date: Nov. 21, 2013

(65) Prior Publication Data
US 2013/0306840 A1 Nov. 21, 2013

(51) Int. Cl.
*G01F 23/00* (2006.01)
(52) U.S. Cl.
USPC .......................... 250/370.08; 250/370.05
(58) Field of Classification Search
USPC ....................... 250/370.08, 370.05
See application file for complete search history.

(56) References Cited

U.S. PATENT DOCUMENTS

| | | | | |
|---|---|---|---|---|
| 4,536,841 A * | 8/1985 | Waechter et al. | ........ | 250/370.05 |
| 5,479,021 A * | 12/1995 | Morgan et al. | .......... | 250/363.04 |
| 7,391,028 B1 * | 6/2008 | Rubenstein | .............. | 250/370.08 |
| 7,911,502 B2 * | 3/2011 | Suzuki | ........................ | 348/222.1 |
| 7,960,700 B2 * | 6/2011 | Craig et al. | .............. | 250/370.01 |
| 7,982,191 B2 * | 7/2011 | Friedman et al. | ............. | 250/374 |
| 8,389,947 B2 * | 3/2013 | Kennedy et al. | ......... | 250/390.01 |
| 2004/0169772 A1 * | 9/2004 | Matsui et al. | ................ | 348/375 |
| 2004/0223075 A1 | 11/2004 | Furlan et al. | | |
| 2004/0227094 A1 * | 11/2004 | Tompa et al. | ............ | 250/370.01 |
| 2005/0023479 A1 * | 2/2005 | Grodzins | ................. | 250/390.11 |
| 2006/0170541 A1 * | 8/2006 | Tompa et al. | ................. | 340/500 |
| 2011/0275356 A1 * | 11/2011 | Best et al. | .................. | 455/414.1 |
| 2012/0112099 A1 * | 5/2012 | Coleman et al. | ........... | 250/473.1 |
| 2012/0292518 A1 * | 11/2012 | Goldstein | ..................... | 250/362 |

* cited by examiner

*Primary Examiner* — David Porta
*Assistant Examiner* — Djura Malevic
(74) *Attorney, Agent, or Firm* — Gordon & Jacobson, PC

(57) ABSTRACT

A mobile electronic device for detecting nuclear radiation levels, where the device has image capturing means comprising a sensor capable of receiving nuclear radiation and converting same to a value indicative of the nuclear radiation level. The device also comprises a shutter translatable from a first orientation covering the sensor (in which radiation level monitoring is allowed) to a second orientation revealing the sensor (in which radiation level monitoring is disallowed). The device may be a modified cellular telephone, satellite telephone, personal digital assistant or tablet personal computer provided with a digital camera, such that camera functionality is maintained and permitted when the shutter is in the second orientation.

30 Claims, 7 Drawing Sheets

DEVICE, METHOD AND SYSTEM FOR DETECTING NUCLEAR RADIATION LEVELS

CROSS-REFERENCE TO RELATED APPLICATIONS

This application claims priority from PCT/CA2012/000469 filed on May 16, 2012 which is hereby incorporated by reference in its entirety.

FIELD OF THE INVENTION

The present invention relates to radiation detectors and sensors, and more specifically to personal-use radiation detectors and sensors.

BACKGROUND OF THE INVENTION

It is known in the art to provide equipment for detecting nuclear radiation levels, including personal-use devices that can be mounted on or carried by a user. Such equipment provides the benefit of identifying and usually quantifying the nuclear radiation level in an area where the user is located, which can be of particular value if the user is in a location susceptible to potentially dangerous radiation exposure. As the equipment can provide an early warning of hazardous radiation levels, this allows the user to vacate the location or don suitable protective gear.

However, while there are many available technologies capable of such use, very few lend themselves to widespread application. This is primarily due to the expense of such solutions, the complexity of use and/or the bulk of the necessary equipment. Radiation detectors are intended to protect users from unsafe radiation exposure, but the failure to achieve widespread deployment of existing technologies hinders that ultimate goal. It is clear that the cost and complexity of specialized equipment presents a significant problem.

It has been recognized that certain image sensors, such as charge-coupled devices (CCD) and complementary metal-oxide-semiconductor devices (CMOS), can be used to identify nuclear radiation levels. Such image sensors have achieved ubiquitous distribution through their use in digital cameras and the incorporation of digital cameras in various consumer electronic products such as cellular telephones. The concept of employing digital cameras for nuclear radiation detection purposes has been noted, and software has been made available for download to enable this. For example, an application for Android™ platform devices is available from Rolf-Dieter Klein at http://www.appbrain.com/app/radioactivitycounter/com.rdklein.radioactivity, and an application for iPhone™ devices is available from WikiSensor at http://wikisensor.com. To use these applications, however, a user must cover the digital camera lens with an opaque tape such as black electrical tape, to prevent visible light from contacting the sensor, which then allows only higher energy photons such as those generated by radioactive sources to penetrate to the sensor. If the tape is permanently employed, the standard image capture functionality of the camera is lost; alternatively, if the tape is removed, the nuclear radiation detection functionality is lost. Also, such known software must be running constantly in the foreground, impacting the use of other applications and draining device battery power reserves.

What is needed, therefore, is a cost-effective solution that can be employed with ubiquitous, mobile consumer electronic devices, taking advantage of the ability of digital camera sensor technology while alternately enabling camera functionality and nuclear radiation detection functionality.

SUMMARY OF THE INVENTION

The present invention therefore seeks to provide a device, method and system for enabling personal-use nuclear radiation detection in an inexpensive, ubiquitous consumer electronic product.

According to a first aspect of the present invention, there is provided a mobile electronic device for detecting nuclear radiation levels, the device comprising:
  image capturing means comprising:
    at least one sensor capable of receiving nuclear radiation and generating an output corresponding to the nuclear radiation; and
    output conversion means capable of converting the output to a value corresponding to the nuclear radiation;
  a shutter adjacent the at least one sensor and translatable from a sensor-covering orientation in which nuclear radiation level monitoring is allowed to a sensor-revealing orientation in which the nuclear radiation level monitoring is disallowed; and computing means for receiving the value and converting the value to a detected nuclear radiation level.

In exemplary embodiments of the first aspect of the present invention, the mobile electronic device is preferably selected from the group consisting of a cellular telephone, a satellite telephone, a personal digital assistant and a tablet personal computer. The image capturing means is preferably a digital camera, and the sensor is preferably selected from the group consisting of charge-coupled devices and complementary metal-oxide-semiconductor devices. In exemplary embodiments, the sensor comprises a photoactive region and a photon conversion region, such that the photoactive region receives photons of the nuclear radiation and the photon conversion region then converts the photons to an electric charge, and the output of the sensor comprises the electric charge. The shutter is preferably a mechanical shutter that is either integrally formed with the casing of the mobile electronic device, affixed to the casing, or integrally formed with an after-market product affixed to a casing of the mobile electronic device. The shutter is configured to block the visible light spectrum while allowing passage therethrough of nuclear radiation.

According to a second aspect of the present invention, there is provided a method for detecting nuclear radiation levels, the method comprising:
  a. providing a mobile electronic device comprising:
    image capturing means comprising:
      at least one sensor; and
      output conversion means;
    a shutter adjacent the at least one sensor and translatable from a sensor-covering orientation in which nuclear radiation level monitoring is allowed to a sensor-revealing orientation in which the nuclear radiation level monitoring is disallowed; and
    computing means;
  b. moving the shutter to the sensor-covering orientation;
  c. initializing operation of the computing means;
  d. allowing the at least one sensor to receive the nuclear radiation and generate an output corresponding to the nuclear radiation;
  e. allowing the output conversion means to convert the output to a value corresponding to the nuclear radiation; and
  f. allowing the computing means to receive the value and convert the value to a detected nuclear radiation level.

In exemplary embodiments of the second aspect of the present invention, the method comprises the further steps of: providing comparison means and setting a warning level; allowing the comparison means to receive the detected nuclear radiation level and compare the detected nuclear radiation level against the warning level; and, when the detected nuclear radiation level is at or above the warning level, generating a high radiation signal. The high radiation signal is preferably manifested by an audio, visual or vibratory cue on the mobile electronic device to alert the user to the dangerous level, and the high radiation signal may also be sent by the mobile electronic device to a remote monitoring location where wireless communication is enabled. The detected nuclear radiation level itself may be stored on the mobile electronic device and/or sent to and stored at a remote location where wireless communication is enabled. Exemplary methods may comprise the further steps of terminating operation of the computing means and moving the shutter to the sensor-revealing orientation, thereby allowing the camera functionality to be restored after nuclear radiation detection activity. The computing means may run in either the foreground or the background of the mobile computing device. The mobile computing device may also further comprise a controller, such that the method comprises the step of allowing the controller to switch the image capturing means between an image capture functionality (when the shutter is in the sensor-revealing orientation) and a nuclear radiation detection functionality (when the shutter is in the sensor-covering orientation), and the controller may also be configured to detect the orientation of the shutter, responding by switching the image capturing means between the image capture functionality (when the shutter is in the sensor-revealing orientation) and the nuclear radiation detection functionality (when the shutter is in the sensor-covering orientation).

According to a third aspect of the present invention, there is provided a system for detecting nuclear radiation levels, the system comprising:
  a mobile electronic device comprising:
  image capturing means comprising:
    at least one sensor capable of receiving nuclear radiation and generating an output corresponding to the nuclear radiation; and
    output conversion means capable of converting the output to a value corresponding to the nuclear radiation; and
  a shutter adjacent the at least one sensor and translatable from a sensor-covering orientation in which nuclear radiation level monitoring is enabled to a sensor-revealing orientation in which the nuclear radiation level monitoring is disabled;
  a memory storage device; and
  a processor in communication with the mobile electronic device and the memory storage device, the processor being operative to receive the value and convert the value to a detected nuclear radiation level.

In exemplary embodiments of the third aspect of the present invention, the memory storage device and the processor may be integrated into the mobile electronic device itself. The memory storage device preferably stores statements and instructions enabling the processor to receive the value and convert the value to a detected nuclear radiation level, and the memory storage device preferably also saves the detected nuclear radiation level. The memory storage device can also be used to store a warning level, and the processor can then compare the detected nuclear radiation level against the warning level, such that when the detected nuclear radiation level is at or above the warning level the processor generates a high radiation signal. The high radiation signal is preferably manifested by an audio, visual or vibratory cue on the mobile electronic device to alert the user, and the high radiation signal may be sent by the mobile electronic device to a remote monitoring location where wireless communication is enabled. The detected nuclear radiation level may also be sent to and stored at a remote location where wireless communication is enabled. The processor can be used to switch the image capturing means between an image capture functionality (when the shutter is in the sensor-revealing orientation) and a nuclear radiation detection functionality (when the shutter is in the sensor-covering orientation), and the processor can be configured to detect the orientation of the shutter and respond by switching the image capturing means between the image capture functionality (when the shutter is in the sensor-revealing orientation) and the nuclear radiation detection functionality (when the shutter is in the sensor-covering orientation).

A detailed description of an exemplary embodiment of the present invention is given in the following. It is to be understood, however, that the invention is not to be construed as being limited to this embodiment.

BRIEF DESCRIPTION OF THE DRAWINGS

In the accompanying drawings, which illustrate an exemplary embodiment of the present invention.

An exemplary embodiment of the present invention will now be described with reference to the accompanying drawings.

DETAILED DESCRIPTION OF EXEMPLARY EMBODIMENT

Device

Figure 1:
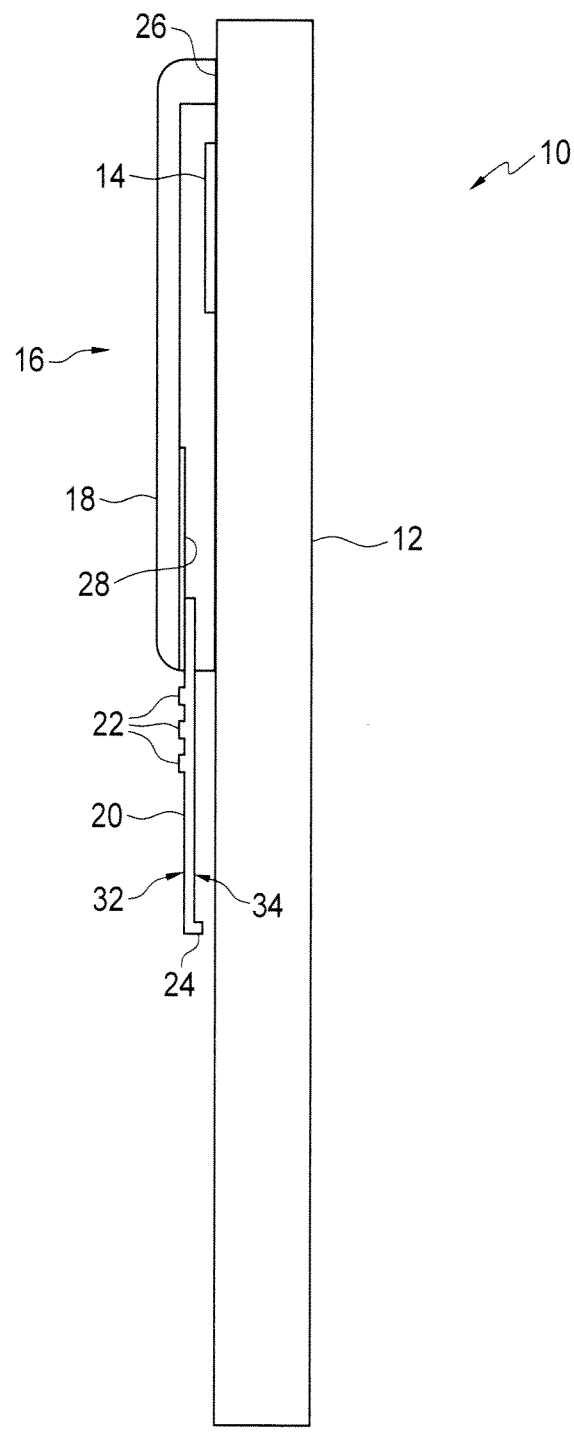
FIG. 1 is a side elevation view of an exemplary device according to the present invention, with a shutter affixed to a cellular phone, the shutter slide in the sensor-revealing orientation.

Referring now to FIGS. 1 to 5, an exemplary embodiment of a device 10 according to the present invention is illustrated. As can be seen in FIG. 1, the device 10 comprises a cellular telephone 12 and a shutter assembly 16, although a satellite telephone, personal digital assistant or tablet personal computer could be used in place of a cellular telephone. The shutter assembly 16 comprises a shutter housing 18 and a shutter slide 20 moveable within the housing 18. The cellular telephone 12 comprises a digital camera, the aperture or lens 14 of which is visible in FIG. 1.

The digital camera also comprises a CCD sensor, the nature, form, operation and utility of which are well know to those skilled in the art. CCD technology is known and used for enabling the movement of electrical charge to an area where it can be manipulated. In the case of digital cameras, for example, a CCD is used for light detection, where a photoactive region receives photons of light and a photon conversion region then converts the photons to an electric charge.

The charge is then commonly amplified and converted into a voltage, which in turn can be converted into a digital signal. In the present invention, the CCD sensor is used to detect potentially harmful nuclear radiation rather than the visible light spectrum, which is enabled in part by the presence of the shutter assembly 16, as is described herein.

The shutter assembly 16 is sized and configured to fit on a standard cellular telephone 12 casing, with sufficient clearance over a standard lens 14. The shutter assembly 16 can either be manufactured with the cellular telephone 12 casing, or alternatively (as illustrated in FIG. 1) as an after-market product affixed to the back of the cellular telephone 12 casing through the use of glue or two-sided tape 26. In a further alternative, the shutter assembly 16 could be provided as part of an after-market product such as a cellular telephone case. Other design options are possible and would be obvious to one skilled in the art, such as designing the shutter assembly 16 as part of a battery compartment cover.

Figure 2:
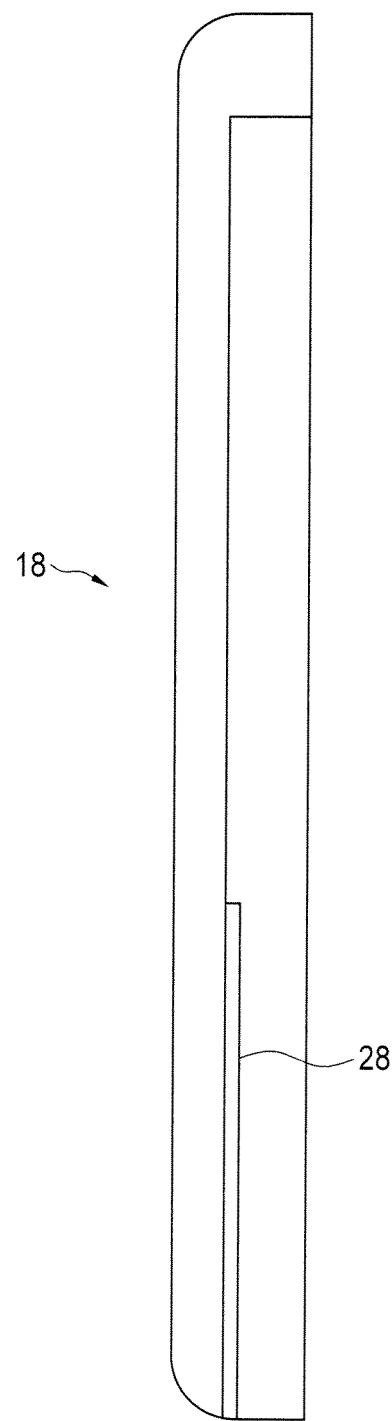
FIG. 2 is a side elevation view of the shutter housing of FIG. 1 without the shutter slide.
Figure 3:
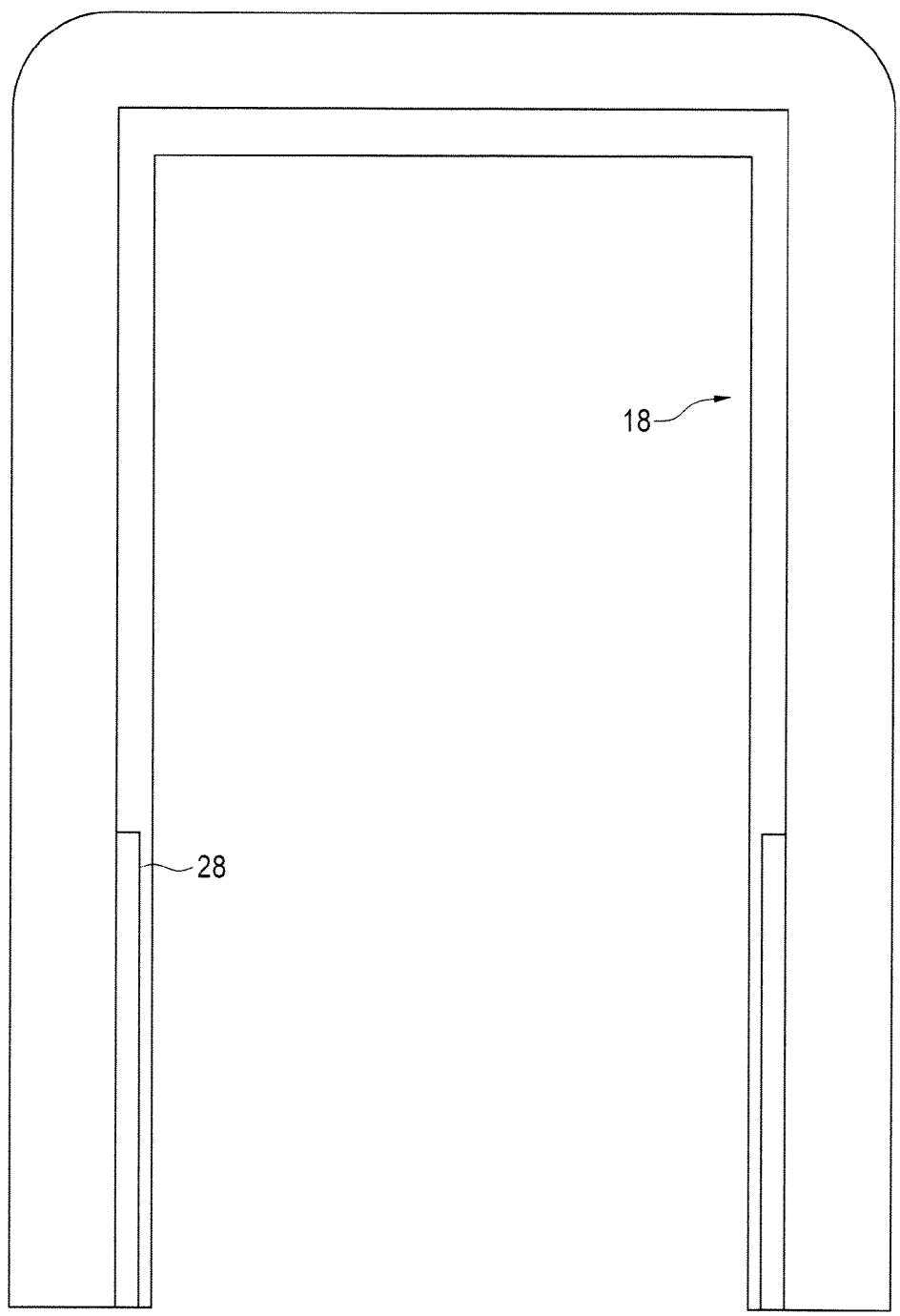
FIG. 3 is a front elevation view of the shutter housing of FIG. 2.
Figure 4:
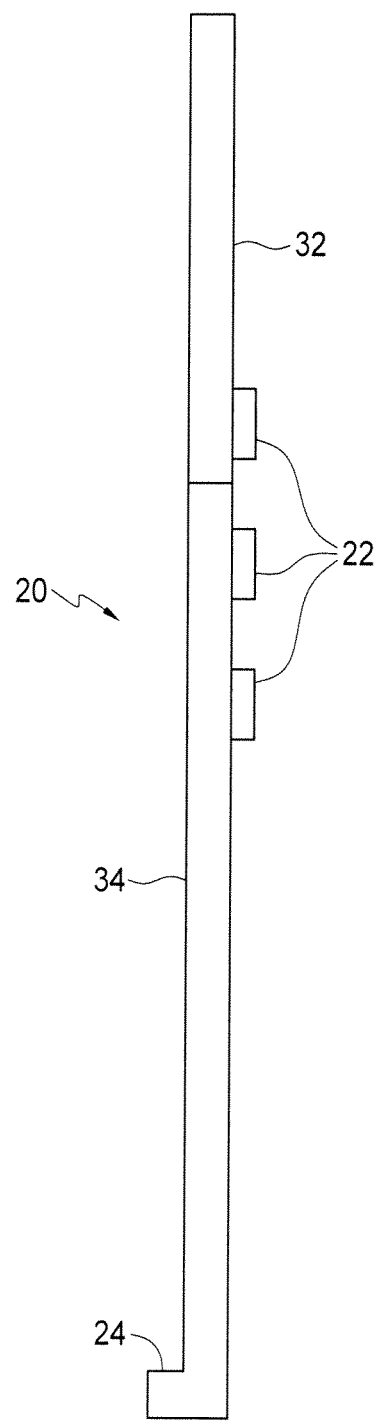
FIG. 4 is a side elevation view of the shutter slide of FIG. 1 without the shutter housing.
Figure 5:
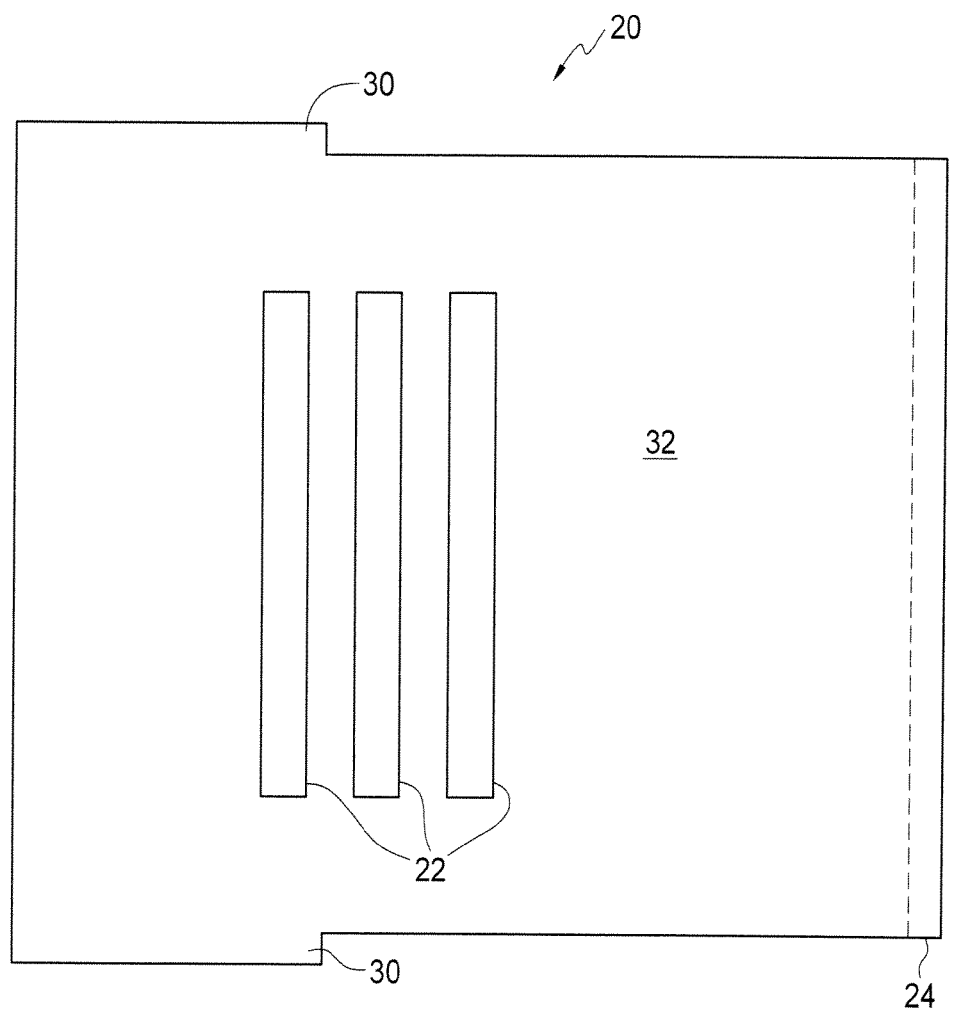
FIG. 5 is a rear elevation view of the shutter slide of FIG. 4.

As can be seen in FIGS. 1 to 3, the slide 20 fits into the housing 18 and slides up and down within the housing 18, from a lowered position in which the lens 14 is uncovered (and the camera/video functionality of the cellular telephone 12 is allowed) to a raised position in which the slide 20 covers the lens 14 and blocks out substantially all of the visible light spectrum. The slide 20 is seated within and guided by a track 28 to enable translation from the lowered to raised positions and back again. The slide 20 is provided with lateral extensions 30 to mate with the track 28 and maintain alignment. The slide 20 is also provided with ridges 22 on an outer surface 32 thereof, as seen in FIGS. 1, 4 and 5, which provide a friction grip for the user's thumb when moving the slide 20 upwardly or downwardly; other friction-providing surfaces such as a rubber pad or tape would be obvious to one skilled in the art. The inner surface 34 of the slide 20, which faces the lens 14, is preferably covered with a light-blocking material such as black felt (not shown), which also provides a seal against the camera 12 casing that allows the slide 20 to move smoothly with a slight, even resistance. The inner surface 34 is also provided with a protective edge 24 that can help to prevent damage to the felt or the introduction of undesirable particulate matter between the shutter assembly 16 and the cellular telephone 12.

The shutter assembly 16 (particularly, at least the portion of the slide 20 that can be positioned over the lens 14) is preferably composed of an opaque plastic material sufficient to block out the visible light spectrum when the slide 20 is in position over the lens 14 (but allows higher energy radiation such as nuclear radiation to contact the sensor in this position over the lens 14). However, it would be obvious to one skilled in the art that other suitable materials could be used, including various metals.

Radiation levels are detected using the imaging sensor (preferably CCD or CMOS) of the cellular telephone 12, with the slide 20 of the shutter assembly 16 blocking out the visible light spectrum and allowing only higher energy radiation such as nuclear radiation to contact the sensor, which then provides a charge to output conversion means capable of converting that charge to a value corresponding to the nuclear radiation level. A software-enabled computing device, which is preferably part of the cellular telephone 12 standard hardware, is then used to analyze this value and determine the actual nuclear radiation level.

Method and System

The present invention also includes methods of using the device to detect nuclear radiation levels. After providing a device in accordance with the present invention, a user moves the shutter to the sensor-covering orientation to prevent use of the device as a camera/video mechanism, then initializes operation of the computing means. The sensor (preferably CCD or CMOS) is then allowed to receive the nuclear radiation and generate an output corresponding to the nuclear radiation. This output is then converted by output conversion means into a value corresponding to the nuclear radiation, and computing means subsequently receive that value and convert it into a detected nuclear radiation level.

Exemplary methods preferably comprise additional steps directed to warning the user of dangerous nuclear radiation levels. To that effect, the method would comprise the following additional steps: providing comparison means and setting a warning level; allowing the comparison means to receive the detected nuclear radiation level and compare the detected nuclear radiation level against the warning level; and, when the detected nuclear radiation level is at or above the warning level, generating a high radiation signal. The comparison means would preferably be integrated with the device hardware through appropriate software. The high radiation signal is preferably manifested by an audio, visual or vibratory cue on the mobile electronic device to alert the user to the dangerous level, such as an alarm sound or a flashing warning indicator on the device display screen or vibration of the device, and the high radiation signal may also be sent by the mobile electronic device to a remote monitoring location where wireless communication is enabled. Remote monitoring may be desirable where a user is employed in a location where high radiation levels can be anticipated, and monitoring of the user is necessary to ensure adequate safety measures are in place, for example in the case of first responders (e.g. police officers) in emergency situations. The detected nuclear radiation level itself may be stored on the device and/or sent to and stored at a remote location.

The computing means comprise appropriate hardware and software, the nature and scope of which would be obvious to one skilled in the art in light of the within teaching. The software resides on the device in the form of an application, and it controls the functions of the imaging sensor and is used to read and interpret the nuclear radiation data. A user interface is also preferably enabled by the software to display various device settings and the detected nuclear radiation levels and also allow for customization such as setting warning levels. The computing means may run in either the foreground or the background of the device. The device may also further comprise a controller with enabling software, such that the method comprises the step of allowing the controller to switch the image capturing means between an image capture functionality (when the shutter is in the sensor-revealing orientation) and a nuclear radiation detection functionality (when the shutter is in the sensor-covering orientation), and the controller may also be configured to detect the orientation of the shutter, responding by switching the image capturing means between the image capture functionality (when the shutter is in the sensor-revealing orientation) and the nuclear radiation detection functionality (when the shutter is in the sensor-covering orientation).

The software can be configured to operate in either a "survey mode" where the application operates in the foreground and the calculated nuclear radiation level is continually displayed to the user, or in a "monitor mode" where the application operates in the background monitoring nuclear radiation levels—if the nuclear radiation exceeds a pre-set limit then the application comes to the foreground and/or alerts the user. The software can be configured to initiate when the device is turned on, or alternatively it can be configured to only operate when the user chooses to run the program. Exemplary methods would also comprise the further steps of terminating operation of the computing means and moving the shutter to the sensor-revealing orientation, thereby allowing the camera/video functionality to be restored after conclusion of the nuclear radiation detection activity.

Figure 6:
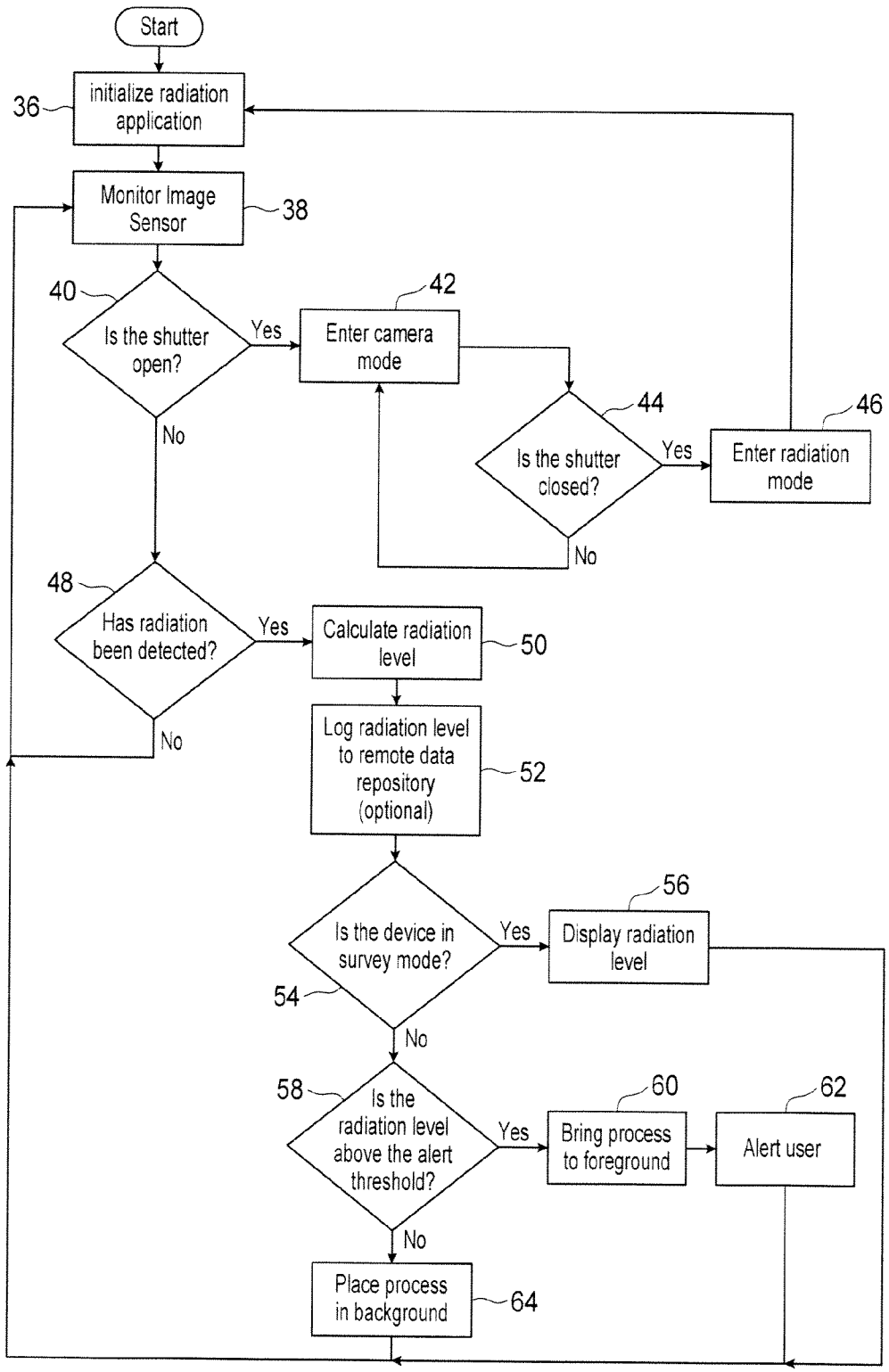
FIG. 6 is a flowchart illustrating one exemplary method according to the present invention.

Turning now to FIG. 6, one exemplary method according to the present invention for detecting nuclear radiation levels is illustrated, but it will be clear that other methods would be obvious based on the teaching herein. Using a device in accordance with the present invention, a user initializes the nuclear radiation detection application at step 36, and the application then monitors the image sensor at step 38. If the shutter is detected as being in the sensor-revealing orientation at step 40, the device will enter camera mode at step 42, where the user can use the device to take pictures and videos as per standard device functionality. If the shutter is subsequently detected at step 44 as being in the sensor-covering orientation, the device will enter nuclear radiation detection mode at step 46 and loop back to monitoring the sensor at step 38. If the shutter is determined at step 40 to be in the sensor-covering orientation, the device is in nuclear radiation detection mode. If nuclear radiation is detected at step 48, the level is calculated to determine future steps. The nuclear radiation level is calculated at step 50 and logged to a remote location at step 52. If the device is determined to be in survey mode at step 54, the nuclear radiation level is displayed on the device at step 56 and the user can respond accordingly. If the device is not in survey mode but the nuclear radiation level is determined at step 58 to be below a pre-set warning level, the application remains functioning in the background at step 64 and no alert will issue. If the device is not in survey mode but the nuclear radiation level is determined at step 58 to be at or above the pre-set warning level, the application will move into the foreground at step 60 and an alert will issue at step 62. The method loops back to allow for continuous monitoring.

The present invention also includes systems for use with a device to detect nuclear radiation levels, such systems being capable of enabling the inventive methods. Such systems comprise a mobile electronic device according to the teaching herein, a memory storage device, and a processor in communication with the mobile electronic device and the memory storage device, the processor being operative to receive the value from the output conversion means and convert the value to a detected nuclear radiation level. While the memory storage device is described as separate from the mobile electronic device, it will be clear to those skilled in the art that it could be integrated with the existing memory storage means in the mobile device. Also, it will be clear that the processor may be integrated in the mobile device and may be co-extensive with the existing processing means of the mobile device. In preferred systems, both the memory storage and processing capacity are integrated with the mobile device itself for the sake of simplicity and cost-effectiveness.

The memory storage device preferably stores statements and instructions enabling the processor to receive the value and convert the value to a detected nuclear radiation level, and the memory storage device preferably also saves the detected nuclear radiation level. The memory storage device can also be used to store a warning level, and the processor can then compare the detected nuclear radiation level against the warning level, such that when the detected nuclear radiation level is at or above the warning level the processor generates a high radiation signal. The high radiation signal is preferably manifested by an audio, visual or vibratory cue on the mobile electronic device to alert the user, and the high radiation signal may be sent by the mobile electronic device to a remote monitoring location where wireless communication is enabled. The detected nuclear radiation level may also be sent to and stored at a remote location where wireless communication is enabled.

The processor can be used to switch the image capturing means between an image capture functionality (when the shutter is in the sensor-revealing orientation) and a nuclear radiation detection functionality (when the shutter is in the sensor-covering orientation), and the processor can be configured to detect the orientation of the shutter and respond by switching the image capturing means between the image capture functionality (when the shutter is in the sensor-revealing orientation) and the nuclear radiation detection functionality (when the shutter is in the sensor-covering orientation). Generation of the software enabling the processor would be within the normal and expected expertise of one skilled in the art and would not require exercise of the inventive faculty.

Figure 7A:
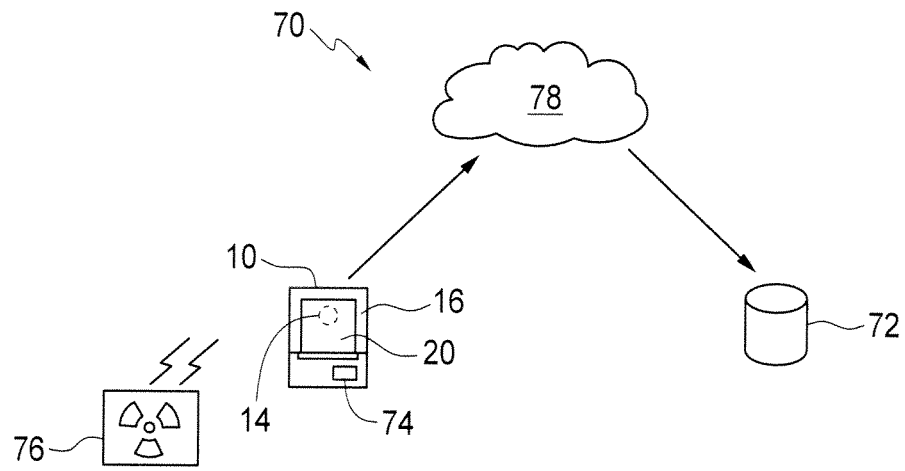
FIGS. 7a and 7b are schematic illustrations of exemplary systems according to the present invention.
Figure 7B:
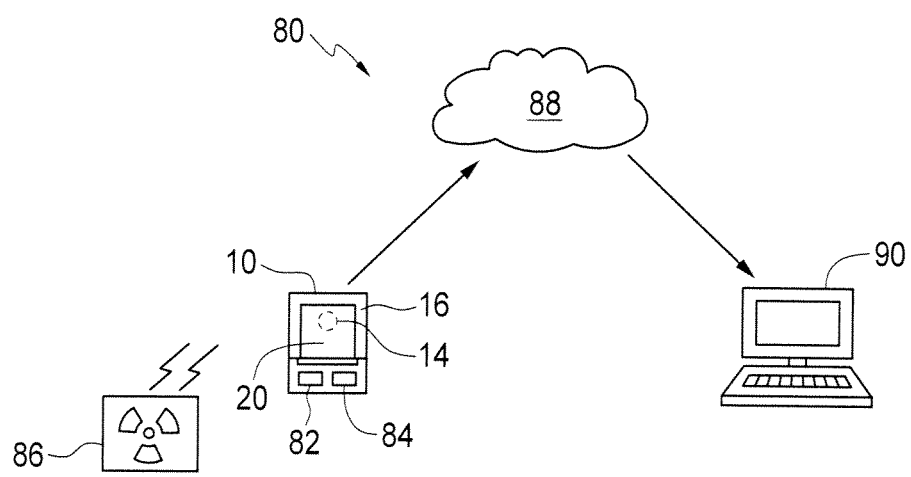

FIGS. 7a and 7b illustrate two alternative embodiments of systems according to the present invention, each employing a device 10 comprising a lens 14, a shutter assembly 16 and a shutter slide 20, and the slide 20 is shown in each case in the sensor-covering orientation such that the nuclear radiation detection functionality can be utilized. In FIG. 7a, a system 70 is illustrated that employs a remote memory storage device 72, with which the device 10 can communicate by means of a wireless communication network 78. The device 10 itself contains the processor 74. When the sensor detects nuclear radiation from a nuclear radiation source 76, it sends a charge to the output conversion means to generate a value, which value is sent to the processor 74 for calculation of a nuclear radiation level. This nuclear radiation level can then be sent by the device 10 through the communication network 78 to the remote memory storage location 72, from which it can be accessed by any other node with access to the network 78 and any relevant security clearance.

In FIG. 7b, a system 80 is illustrated that includes a remote monitoring station 90, with which the device 10 can communicate by means of a wireless communication network 88. The device 10 itself contains the memory storage device 82 and the processor 84. When the sensor detects nuclear radiation from the nuclear radiation source 86, it sends a charge to the output conversion means to generate a value, which value is sent to the processor 84 for calculation of a nuclear radiation level. This nuclear radiation level can then be sent by the device 10 through the communication network 88 to the remote monitoring station 90 for further action.

As can be clearly seen, then, there are significant advantages provided by the present invention. For example, the shutter can be inexpensively produced and the user's mobile electronic device already has the necessary sensor technology, storage and processing means installed, so a personal detector can be achieved at a very low incremental cost, without the need for additional equipment for a user to carry. Also, the software can be easily configured to run in the background when the shutter is in position over the lens, allowing other device functionality to be accessible, and the user can quickly switch to standard camera functionality to take a picture or video by opening the shutter.

The foregoing is considered as illustrative only of the principles of the invention. The scope of the claims should not be limited by the exemplary embodiment set forth in the foregoing, but should be given the broadest interpretation consistent with the specification as a whole.

The invention claimed is:

1. A mobile electronic device for detecting nuclear radiation levels, the device comprising:
   image capturing means comprising:
      at least one sensor capable of receiving nuclear radiation and generating an output corresponding to the nuclear radiation; and
      output conversion means capable of converting the output to a value corresponding to the nuclear radiation;
   a shutter adjacent the at least one sensor and translatable from a sensor-covering orientation in which nuclear radiation level monitoring is allowed to a sensor-revealing orientation in which the nuclear radiation level monitoring is disallowed; and
   computing means for receiving the value and converting the value to a detected nuclear radiation level.

2. The device of claim 1 wherein the mobile electronic device is selected from the group consisting of a cellular telephone, a satellite telephone, a personal digital assistant and a tablet personal computer.

3. The device of claim 1 wherein the image capturing means is a digital camera.

4. The device of claim 1 wherein the at least one sensor is selected from the group consisting of charge-coupled devices and complementary metal-oxide-semiconductor devices.

5. The device of claim 1 wherein the at least one sensor comprises a photoactive region and a photon conversion region, such that the photoactive region receives photons of the nuclear radiation and the photon conversion region then converts the photons to an electric charge, and the output of the sensor comprises the electric charge.

6. The device of claim 1 wherein the shutter is a mechanical shutter integrally formed with a casing of the mobile electronic device.

7. The device of claim 1 wherein the shutter is a mechanical shutter affixed to a casing of the mobile electronic device.

8. The device of claim 1 wherein the shutter is a mechanical shutter integrally formed with an after-market product affixed to a casing of the mobile electronic device.

9. The device of claim 1 wherein the shutter is configured to block visible light spectrum while allowing passage therethrough of nuclear radiation.

10. A method for detecting nuclear radiation levels, the method comprising:
   a. providing a mobile electronic device comprising:
      image capturing means comprising:
         at least one sensor; and
         output conversion means;
      a shutter adjacent the at least one sensor and translatable from a sensor-covering orientation in which nuclear radiation level monitoring is allowed to a sensor-revealing orientation in which the nuclear radiation level monitoring is disallowed; and
      computing means;
   b. moving the shutter to the sensor-covering orientation;
   c. initializing operation of the computing means;
   d. allowing the at least one sensor to receive the nuclear radiation and generate an output corresponding to the nuclear radiation;
   e. allowing the output conversion means to convert the output to a value corresponding to the nuclear radiation; and
   f. allowing the computing means to receive the value and convert the value to a detected nuclear radiation level.

11. The method of claim 10 comprising the further steps of:
   providing comparison means and setting a warning level;
   allowing the comparison means to receive the detected nuclear radiation level and compare the detected nuclear radiation level against the warning level; and
   when the detected nuclear radiation level is at or above the warning level, generating a high radiation signal.

12. The method of claim 11 wherein the high radiation signal is manifested by an audio, visual or vibratory cue on the mobile electronic device.

13. The method of claim 11 wherein the high radiation signal is sent by the mobile electronic device to a remote monitoring location.

14. The method of claim 10 wherein the detected nuclear radiation level is stored on the mobile electronic device.

15. The method of claim 10 wherein the detected nuclear radiation level is sent to and stored at a remote location.

16. The method of claim 10 comprising the further steps of:
   g. terminating operation of the computing means; and
   h. moving the shutter to the sensor-revealing orientation.

17. The method of claim 10 wherein the computing means run in the foreground of the mobile computing device.

18. The method of claim 10 wherein the computing means run in the background of the mobile computing device.

19. The method of claim 10 wherein the mobile computing device further comprises a controller, the method comprising the step of allowing the controller to switch the image capturing means between an image capture functionality when the shutter is in the sensor-revealing orientation and a nuclear radiation detection functionality when the shutter is in the sensor-covering orientation.

20. The method of claim 19 wherein the controller detects orientation of the shutter and responds by switching the image capturing means between the image capture functionality when the shutter is in the sensor-revealing orientation and the nuclear radiation detection functionality when the shutter is in the sensor-covering orientation.

21. A system for detecting nuclear radiation levels, the system comprising:
   a mobile electronic device comprising:
      image capturing means comprising:
         at least one sensor capable of receiving nuclear radiation and generating an output corresponding to the nuclear radiation; and
         output conversion means capable of converting the output to a value corresponding to the nuclear radiation; and
      a shutter adjacent the at least one sensor and translatable from a sensor-covering orientation in which nuclear radiation level monitoring is enabled to a sensor-revealing orientation in which the nuclear radiation level monitoring is disabled;
   a memory storage device; and
   a processor in communication with the mobile electronic device and the memory storage device, the processor being operative to receive the value and convert the value to a detected nuclear radiation level.

22. The system of claim 21 wherein the memory storage device and the processor are integrated into the mobile electronic device.

23. The system of claim 21 wherein the memory storage device stores statements and instructions enabling the processor to receive the value and convert the value to a detected nuclear radiation level.

24. The system of claim 21 wherein the memory storage device saves the detected nuclear radiation level.

25. The system of claim 21 wherein:
the memory storage device stores a warning level;
the processor compares the detected nuclear radiation level against the warning level; and
when the detected nuclear radiation level is at or above the warning level, the processor generates a high radiation signal.

26. The system of claim 25 wherein the high radiation signal is manifested by an audio, visual or vibratory cue on the mobile electronic device.

27. The system of claim 25 wherein the high radiation signal is sent by the mobile electronic device to a remote monitoring location.

28. The system of claim 21 wherein the detected nuclear radiation level is sent to and stored at a remote location.

29. The system of claim 21 wherein the processor switches the image capturing means between an image capture functionality when the shutter is in the sensor-revealing orientation and a nuclear radiation detection functionality when the shutter is in the sensor-covering orientation.

30. The system of claim 22 wherein the processor detects orientation of the shutter and responds by switching the image capturing means between the image capture functionality when the shutter is in the sensor-revealing orientation and the nuclear radiation detection functionality when the shutter is in the sensor-covering orientation.

* * * * *